US011097573B2

(12) United States Patent
Ohta

(10) Patent No.: US 11,097,573 B2
(45) Date of Patent: Aug. 24, 2021

(54) PNEUMATIC TIRE

(71) Applicant: TOYO TIRE & RUBBER CO., LTD., Itami (JP)

(72) Inventor: Kazuki Ohta, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 207 days.

(21) Appl. No.: 16/210,184

(22) Filed: Dec. 5, 2018

(65) Prior Publication Data

US 2019/0184756 A1 Jun. 20, 2019

(30) Foreign Application Priority Data

Dec. 20, 2017 (JP) .............................. JP2017-243762

(51) Int. Cl.
*B60C 11/01* (2006.01)
*B60C 11/13* (2006.01)
(Continued)

(52) U.S. Cl.
CPC ............ *B60C 11/045* (2013.01); *B60C 11/01* (2013.01); *B60C 11/13* (2013.01);
(Continued)

(58) Field of Classification Search
CPC ....... B60C 2011/0348; B60C 2011/039; B60C 2011/0393; B60C 2011/133; B60C 2011/013; B60C 11/01; B60C 11/045
(Continued)

(56) References Cited

U.S. PATENT DOCUMENTS

2008/0128063 A1 6/2008 Ohara
2008/0163970 A1* 7/2008 Ohara ................. B60C 11/0309
152/523

(Continued)

FOREIGN PATENT DOCUMENTS

CN 101190645 A 6/2008
CN 101219633 A 7/2008
(Continued)

OTHER PUBLICATIONS

Machine Translation: JP-2008279865-A, Ishizaka, Takahide, (Year: 2020).*
(Continued)

*Primary Examiner* — Kendra Ly
(74) *Attorney, Agent, or Firm* — Westerman, Hattori, Daniels & Adrian, LLP

(57) ABSTRACT

A pneumatic tire is provided with tread rubber that forms a contact patch; and a belt layer which is disposed toward the interior in a tire radial direction from the tread rubber. A shoulder lug portion is provided with a narrow groove that partitions the shoulder lug portion into a main body portion and into a sacrificial portion. A plurality of concavities are open toward both the contact patch at the main body portion and the groove side face, wherein innermost ends in the tire width direction of the respective concavities are disposed so as to be at the same location in the tire width direction as an outermost end in the tire width direction of the belt layer or are arranged toward the exterior in the tire width direction from the outermost end in the tire width direction of the belt layer.

15 Claims, 4 Drawing Sheets

(51) Int. Cl.
*B60C 11/04* (2006.01)
*B60C 11/03* (2006.01)

(52) U.S. Cl.
CPC . *B60C 2011/013* (2013.01); *B60C 2011/0348* (2013.01); *B60C 2011/0393* (2013.01); *B60C 2011/0397* (2013.01); *B60C 2011/133* (2013.01)

(58) Field of Classification Search
USPC .................................................. 152/209.27
See application file for complete search history.

(56) References Cited

U.S. PATENT DOCUMENTS

| | | | | |
|---|---|---|---|---|
| 2010/0314013 | A1* | 12/2010 | Miyake | B60C 11/01 152/209.18 |
| 2013/0048172 | A1* | 2/2013 | Tanada | B60C 9/28 152/209.18 |
| 2015/0343849 | A1 | 12/2015 | Tanaka et al. | |

FOREIGN PATENT DOCUMENTS

| | | | |
|---|---|---|---|
| CN | 105313602 | A | 2/2016 |
| JP | 2007-106255 | A | 4/2007 |
| JP | 2008-168672 | A | 7/2008 |
| JP | 2008-168872 | A | 7/2008 |
| JP | 2008279865 | A * | 11/2008 |
| JP | 2009090949 | A * | 4/2009 |
| JP | 2010-70065 | A | 4/2010 |

OTHER PUBLICATIONS

Machine Translation: JP-2009090949-A, Tamura, Daisuke, (Year: 2020).*

Office Action dated Aug. 4, 2020, issued in counterpart CN application No. 201811486434.1, with English translation. (16 pages).

Office Action dated Mar. 29, 2021, issued in counterpart CN application No. 201811486434.1, with English translation. (16 pages).

* cited by examiner

PNEUMATIC TIRE

TECHNICAL FIELD

The present disclosure relates to a pneumatic tire.

BACKGROUND ART

A tire in which the tread rubber is partitioned into a plurality of lug portions (e.g., ribs) by a plurality of major grooves extending in the tire circumferential direction is known. Such a tire might be provided with a belt layer that extends in the tire circumferential direction and that is disposed at a location toward the interior in the tire radial direction from the tread rubber; or more specifically, between the tread rubber and the carcass.

With such a tire, at the shoulder lug portion, which is that one among the plurality of lug portions that is outwardmostly disposed in the tire width direction, it is sometimes the case that there is occurrence of uneven wear in which wear progresses from the outwardmost end in the tire width direction to the inwardmost end in the tire width direction.

To suppress such uneven wear, the shoulder lug is sometimes divided into a main body portion and a sacrificial portion by a narrow groove which extends in the tire circumferential direction. This narrow groove is sometimes referred to as a defense groove. The main body portion of the shoulder lug portion extends in the tire circumferential direction and is disposed at a location toward the interior in the tire width direction from the narrow groove. On the other hand, the sacrificial portion of the shoulder lug portion extends in the tire circumferential direction and is disposed at a location toward the exterior in the tire width direction from the narrow groove.

PRIOR ART REFERENCES

Patent References

PATENT REFERENCE NO. 1: Japanese Patent Application Publication Kokai No. 2008-168872
PATENT REFERENCE NO. 2: Japanese Patent Application Publication Kokai No. 2010-70065
PATENT REFERENCE NO. 3: Japanese Patent Application Publication Kokai No. 2008-168672
PATENT REFERENCE NO. 4: Japanese Patent Application Publication Kokai No. 2007-106255

SUMMARY OF INVENTION

Problem to be Solved by Invention

However, at or near the edge (edge toward the exterior in the tire width direction) of the main body portion at the shoulder lug portion, there may sometimes be occurrence of step wear and/or river wear. Step wear and river wear are both types of wear that produce step(s) in the tire width direction. Step wear is a type of wear that extends in discontinuous fashion in the tire circumferential direction; river wear is a type of wear that extends in continuous fashion in the tire circumferential direction.

It is an object of the present disclosure to provide a pneumatic tire capable of suppressing step wear and river wear.

Means for Solving Problem

A pneumatic tire in accordance with the present disclosure is provided with tread rubber that forms a contact patch; and a belt layer which is disposed toward the interior in a tire radial direction from the tread rubber; wherein the tread rubber is provided with a plurality of lug portions extending in a tire circumferential direction; wherein a shoulder lug portion, which is disposed in outermost fashion in a tire width direction among the plurality of lug portions, is provided with a narrow groove extending in the tire circumferential direction that partitions the shoulder lug portion into a main body portion and into a sacrificial portion which is disposed toward the exterior in the tire width direction from the main body portion; wherein formed with spaces therebetween in the tire circumferential direction, at an edge at which the contact patch at the main body portion and a groove side face toward the interior in the tire width direction that forms the narrow groove intersect, there are a plurality of concavities that are open toward both the contact patch at the main body portion and the groove side face; and wherein innermost ends in the tire width direction of the respective concavities are disposed so as to be at the same location in the tire width direction as an outermost end in the tire width direction of the belt layer or are arranged toward the exterior in the tire width direction from the outermost end in the tire width direction of the belt layer.

EMBODIMENTS FOR CARRYING OUT INVENTION

A pneumatic tire in accordance with an embodiment of the present disclosure is provided with tread rubber that forms a contact patch; and a belt layer which is disposed toward the interior in a tire radial direction from the tread rubber; wherein the tread rubber is provided with a plurality of lug portions extending in a tire circumferential direction; wherein a shoulder lug portion, which is disposed in outermost fashion in a tire width direction among the plurality of lug portions, is provided with a narrow groove extending in the tire circumferential direction that partitions the shoulder lug portion into a main body portion and into a sacrificial portion which is disposed toward the exterior in the tire width direction from the main body portion; wherein formed with spaces therebetween in the tire circumferential direction, at an edge at which the contact patch at the main body portion and a groove side face toward the interior in the tire width direction that forms the narrow groove intersect, there are a plurality of concavities that are open toward both the contact patch at the main body portion and the groove side face; and wherein innermost ends in the tire width direction of the respective concavities are disposed so as to be at the same location in the tire width direction as the outermost end in the tire width direction of the belt layer or are arranged toward the exterior in the tire width direction from the outermost end in the tire width direction of the belt layer.

A pneumatic tire in accordance with an embodiment of the present disclosure may suppress occurrence of step wear and river wear. This is because a pneumatic tire in accordance with an embodiment of the present disclosure may permit suppression of nonuniformity in the tire circumferential direction of contact patch pressure at region(s) between narrow groove(s) and outermost end(s) in the tire width direction of belt layer(s) at main body portion(s).

First Embodiment

Figure 3:
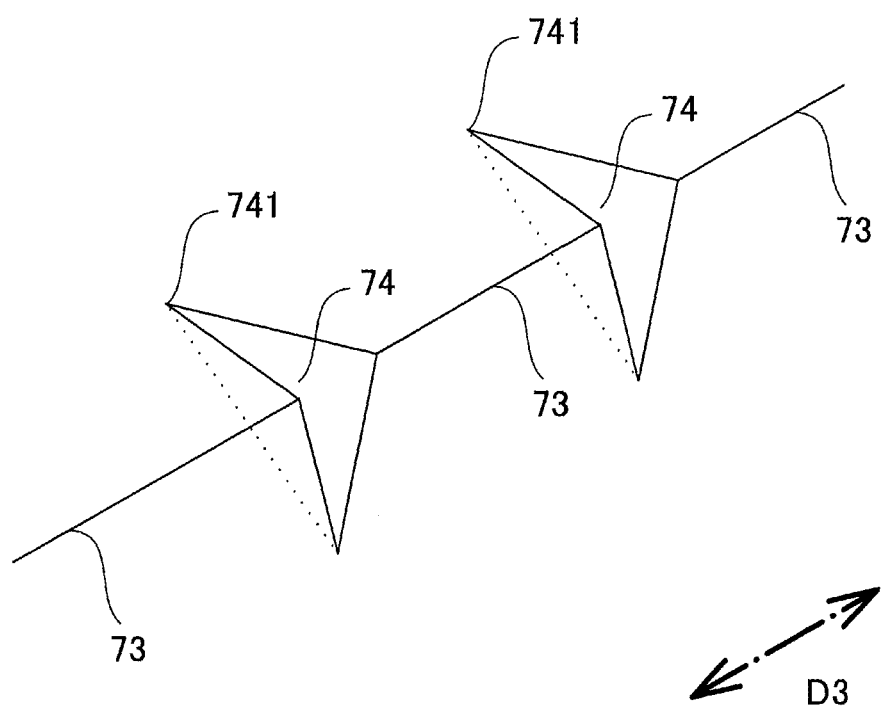
FIG. 3 Perspective view of the principal components in a pneumatic tire associated with a first embodiment.
Figure 4:
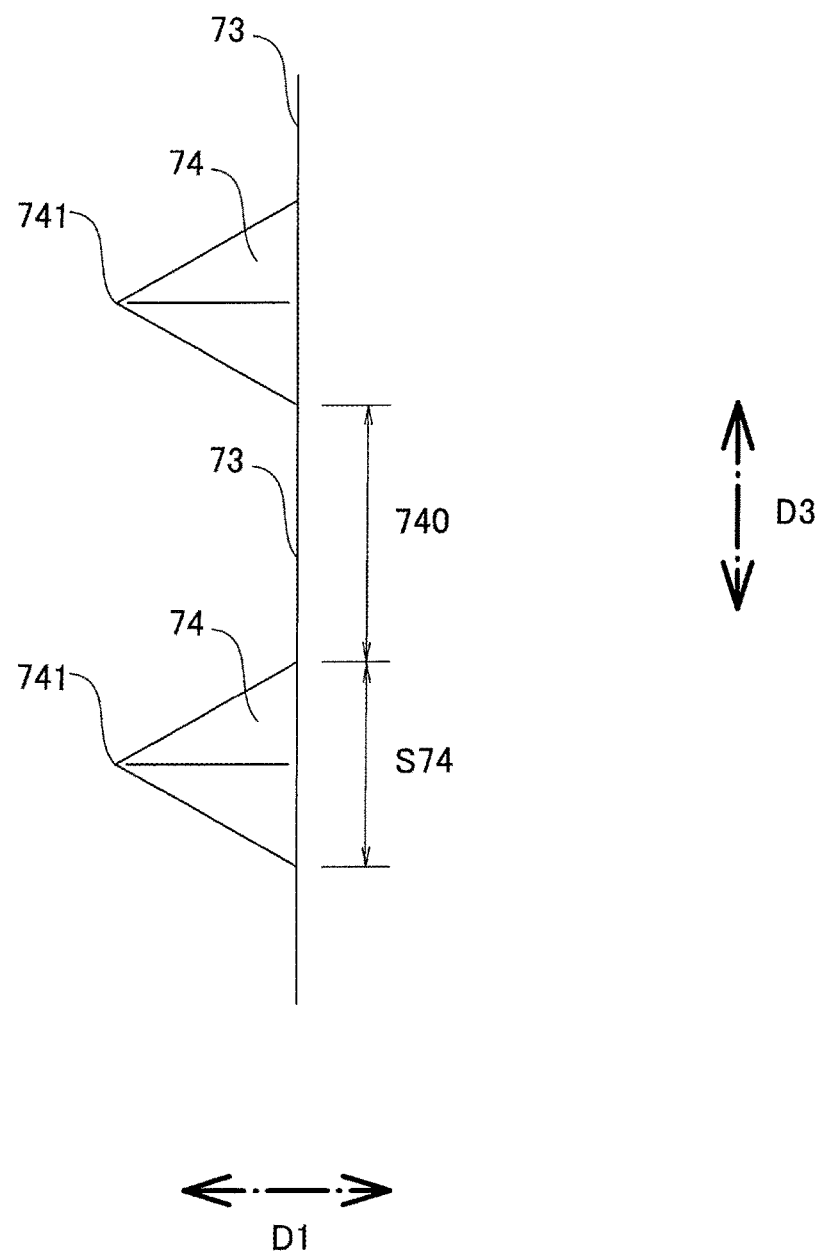
FIG. 4 Plan view of the principal components in a pneumatic tire associated with a first embodiment.

Below, a first embodiment in accordance with the present disclosure is described with reference to the drawings. Tire width direction D1 shown in FIG. 1 and elsewhere is a direction that is parallel to the rotational axis of the tire. Tire radial direction D2 is in the direction of the diameter of tire 9. Tire circumferential direction D3 shown in FIG. 3 and elsewhere is a direction that is circumferential with respect to the rotational axis of the tire. The tire equatorial plane is a plane that is located centrally in the tire width direction D1 and that is perpendicular to the rotational axis of the tire. Tire meridional planes are planes that are perpendicular to the tire equatorial plane and that contain the rotational axis of the tire. At the respective drawings, note that dimensional ratios in the drawings and actual dimensional ratios are not necessarily consistent, and note further that dimensional ratios are not necessarily consistent from drawing to drawing.

Figure 1:
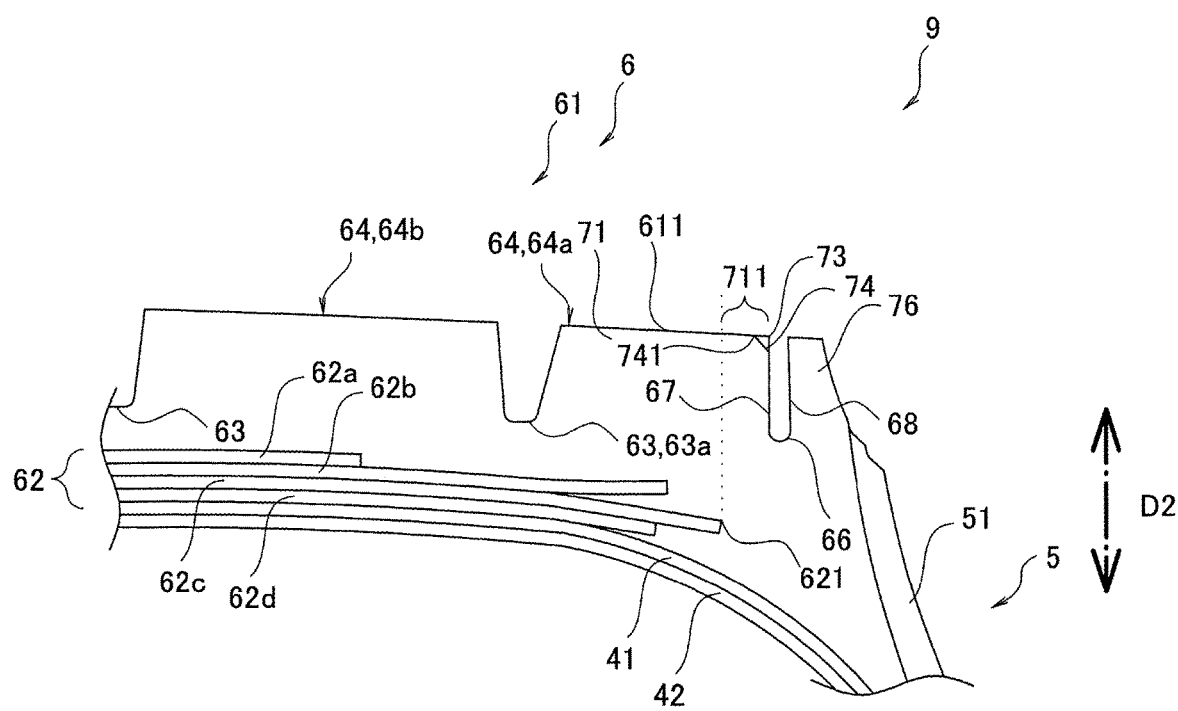
FIG. 1 View of a section, taken along a tire meridional plane, of the principal components in a pneumatic tire associated with a first embodiment.
Figure 2:
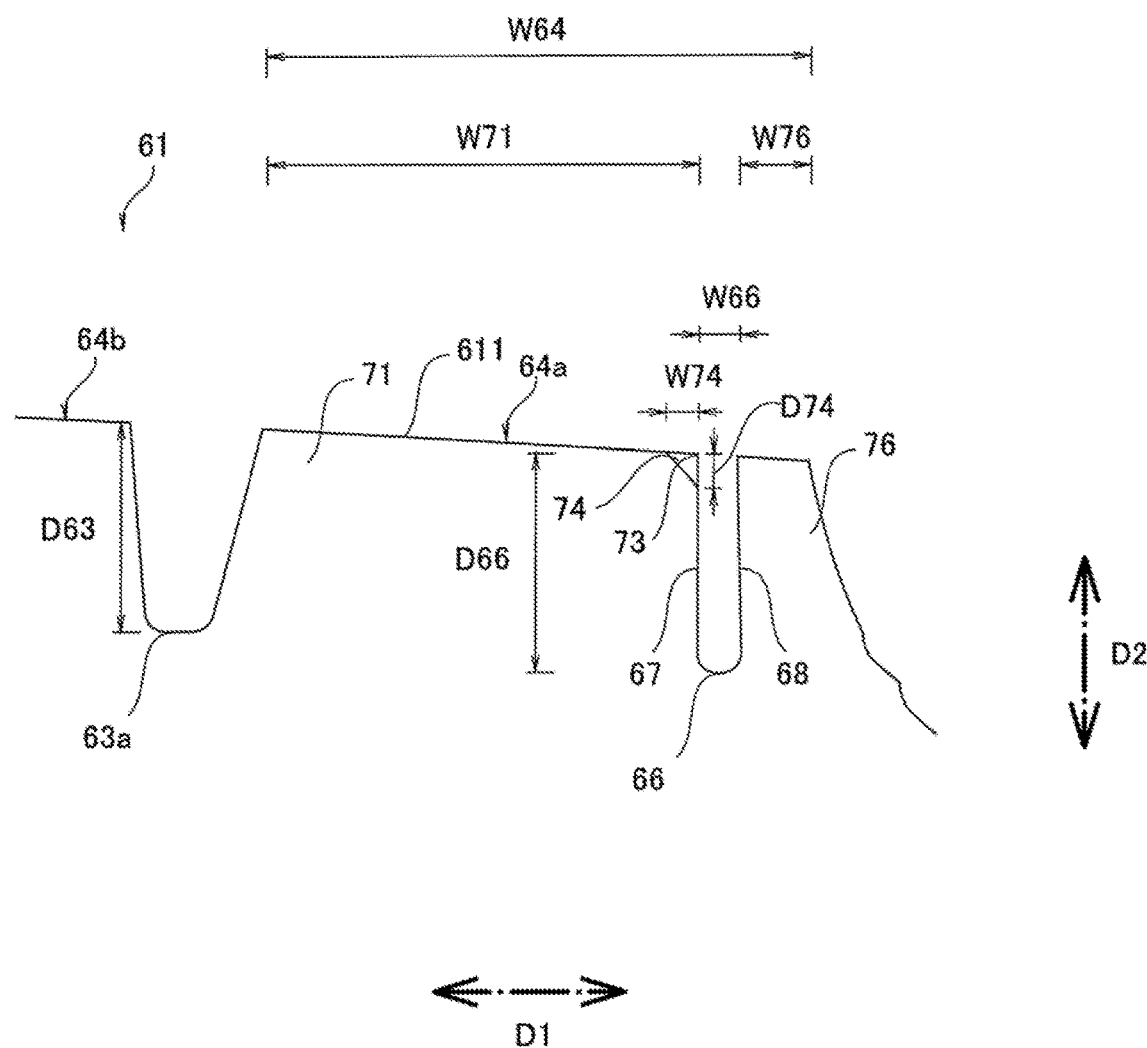
FIG. 2 Enlarged view of a portion of what is shown in FIG. 1.

As shown in FIG. 1 and FIG. 2, tire 9 of the first embodiment is provided with a pair of bead regions (not shown); sidewall regions 5 which extend outwardly in the tire radial direction D2 from the respective bead regions; and tread region 6 which is contiguous with the outer ends in the tire radial direction D2 of the pair of sidewall regions 5. Tire 9 is mounted on a rim (not shown), and the interior of tire 9 is inflated to pressure with air. Tire 9 is thus a pneumatic tire. Tire 9 may be used on a truck or bus.

Tire 9 is provided with carcass 41 which spans the distance between the cores of the pair of beads, and innerliner rubber 42 which is arranged at a location toward the interior from carcass 41 and which is for retaining air pressure. Carcass 41 and innerliner rubber 42 are arranged in parallel fashion with respect to the inner circumferential surface of the tire over a portion thereof that encompasses the bead regions, sidewall regions 5, and tread region 6. Carcass 41 is provided with a single carcass ply. The carcass ply folds back upon itself and wraps about the bead core so as to envelop the bead core (not shown) and the bead filler (not shown). The carcass ply is provided with a plurality of ply cords which are arrayed in direction(s) more or less perpendicular to the tire circumferential direction D3, and topping rubber with which the ply cords are covered. Polyester, rayon, Nylon, aramid, and/or other such organic fiber(s) and/or steel and/or other such metal(s) may be favorably used at the ply cords. Carcass 41 may be provided with two or more carcass plies.

The bead regions are each provided with a bead core (not shown) having an annular locus, and with bead filler (not shown) having an annular locus and extending outwardly in the tire radial direction D2 from the bead core. The bead core is formed by laminating rubber-covered bead wire(s) (e.g., bronze-plated steel wire(s) or the like). On the other hand, the bead filler comprises rubber that is harder than that of sidewall rubber 51. The bead region is further provided with rim strip rubber (not shown) which comes in contact with the rim (not shown) when the tire is mounted on a rim. The outer end in the tire radial direction D2 of the rim strip rubber is contiguous with the inner end in the tire radial direction D2 of sidewall rubber 51. Hardness of the rim strip rubber is greater than hardness of sidewall rubber 51.

Sidewall regions 5 are each provided with sidewall rubber 51 at a location toward the exterior in the tire width direction D1 from carcass 41. The outer end in the tire radial direction D2 of sidewall rubber 51 is contiguous with the outer end in the tire width direction D1 of tread rubber 61.

Tread region 6 is provided with belt layer 62 at a location toward the exterior in the tire radial direction D2 from carcass 41. Belt layer 62 is disposed between carcass 41 and tread rubber 61. Belt layer 62 is provided with four belt plies 62a, 62b, 62c, 62d. Of the belt plies that make up belt layer 62, first belt ply 62a is disposed in outwardmost fashion thereamong in the tire radial direction D2. Arranged in order as one proceeds from first belt ply 62a toward the interior in the tire radial direction D2 are second belt ply 62b, third belt ply 62c, and fourth belt ply 62d. The respective belt plies are each made up of a plurality of steel cords arrayed in parallel together with the rubber with which these are covered. The outermost end in the tire width direction of third belt ply 62c is more outwardly disposed in the tire width direction D1 than the outermost end in the tire width direction of any of the other belt plies. The outermost end in the tire width direction of third belt ply 62c thus constitutes the outermost end 621 in the tire width direction of belt layer 62.

Tread region 6 is provided with tread rubber 61 at a location toward the exterior in the tire radial direction D2 from carcass 41. Tread rubber 61 is provided with cap tread rubber which forms contact patch 611, and base rubber which is disposed toward the interior in the tire radial direction D2 from the cap tread rubber. Note that the boundary between the cap tread rubber and the base rubber is not shown in the drawings.

Tread region 6 is provided with a plurality of major grooves 63 that extend in the tire circumferential direction D3. Major groove 63 refers to a groove at contact patch 611 that extends in the tire circumferential direction D3 and is not less than 8.0 mm in width. With regard to the number of major grooves 63 that are present, there might for example be three to seven thereof. Each major groove 63 extends continuously in the tire circumferential direction D3. Widths of the respective major groove 63 may be the same or different. Depths of the respective major groove 63 may be the same or different. Of the plurality of major grooves 63, first major groove(s) 63a is disposed in outwardmost fashion thereamong in the tire width direction D1.

Tread region 6 is partitioned by such major grooves 63 into a plurality of lug portions 64 that extend continuously in the tire circumferential direction D3. Respective lug portion(s) 64 may be partitioned by lateral groove(s) that are shallower than major groove(s) 63 and that extend in such fashion as to intersect the tire circumferential direction D3. Width(s) of lateral groove(s) at contact patch 611 are narrower than width(s) of major groove(s) 63 at contact patch 611, being for example 4.5 mm to 6.5 mm.

Focusing on first major groove 63a, which of the plurality of major grooves 63 is disposed in outwardmost fashion thereamong in the tire width direction D1, tread region 6 is partitioned by first major groove 63a into shoulder lug portion(s) 64a and lug portion(s) 64b. Shoulder lug portion 64a is disposed toward the exterior in the tire width direction D1 from first major groove 63a. On the other hand, lug portion 64b is disposed toward the interior in the tire width direction D1 from shoulder lug portion 64a.

Shoulder lug portion 64a is provided with narrow groove(s) 66 that partition shoulder lug portion 64a into main body portion(s) 71 and sacrificial portion(s) 76. Narrow groove 66 extends continuously in the tire circumferential direction D3. Narrow groove 66 is narrower than any major groove 63. Width W66 (see FIG. 2) of narrow groove 66 at contact patch 611 might, for example, be 4.0% to 7.0% of width W71 of main body portion 71. Depth D66 of narrow groove 66 is not greater than depth D63 of first major groove 63a. In a sectional view taken along a meridional plane, the bottom of narrow groove 66 has a rounded profile, the bottom being deeper at the central portion thereof.

Groove side face 67 toward the interior in the tire width direction that forms narrow groove 66 is parallel to the tire equatorial plane. The fact that groove side face 67 is thus made parallel to the tire equatorial plane makes it possible to suppress occurrence of cracking at the bottom of narrow groove 66.

On the other hand, groove side face 68 toward the exterior in the tire width direction that forms narrow groove 66 is inclined with respect to the tire equatorial plane in such fashion as to cause the groove width of narrow groove 66 to become larger toward the interior side thereof in the tire radial direction D2. In a sectional view taken along a meridional plane, the angle formed between groove side face 68 and contact patch 611 might, for example, be 75° to 85°.

Shoulder lug portion 64a is provided with main body portion(s) 71 disposed toward the interior in the tire width direction D1 from narrow groove 66. Main body portion 71 extends in the tire circumferential direction D3. Width W71 of main body portion 71 at contact patch 611 might, for example, be 80% to 95% of width W64 of shoulder lug portion 64a at contact patch 611. Width W71 of main body portion 71 is measured in the tire width direction D1.

Shoulder lug portion 64a is provided with sacrificial portion(s) 76 disposed toward the exterior in the tire width direction D1 from main body portion 71. Sacrificial portion 76 extends in the tire circumferential direction D3. Width W76 of sacrificial portion 76 at contact patch 611 might, for example, be 5.0% to 10.0% of width W64 of shoulder lug portion 64a at contact patch 611. Width W64 of shoulder lug portion 64a is measured in the tire width direction D1.

As shown in FIG. 1 through FIG. 4, a plurality of concavities 74 are formed at edge 73 at which contact patch 611 at main body portion 71 and groove side face 67 toward the interior in the tire width direction that forms narrow groove 66 intersect. The respective concavities 74 are open toward both contact patch 611 at main body portion 71 and groove side face 67. The innermost ends 741 in the tire width direction of the respective concavities 74 are at the same location in the tire width direction D1. In the example shown in FIG. 1, the innermost ends 741 in the tire width direction of the respective concavities 74 are arranged toward the exterior in the tire width direction D1 from the outermost end 621 in the tire width direction of belt layer 62. Note, however, that the innermost ends 741 in the tire width direction of the respective concavities 74 may be disposed such that the locations thereof in the tire width direction D1 are the same as the location of the outermost end 621 in the tire width direction of belt layer 62. Widths W74 of the respective concavities 74 at contact patch 611 are equal. Width W74 is measured in the tire width direction D1. Widths W74 of the respective concavities 74 might, for example, be 1% to 5% of width W71 of main body portion 71. Dimensions D74 in the tire radial direction D2 at the respective concavities 74 are equal. Dimension D74 is 10% to 15% of depth D63 of first major groove 63a. On the other hand, dimensions S74 (see FIG. 4) in the tire circumferential direction D3 at the respective concavities 74 are equal. The respective concavities 74 each have a notch-like locus, being provided with two faces. Main body portion 71 might, for example, be provided with 160 to 480 concavities 74.

This plurality of concavities 74 is formed with spaces 740 (see FIG. 4) therebetween in the tire circumferential direction D3. Spaces 740 are of constant magnitude. Where it is said that spaces 740 are of constant magnitude, note that this means that—for the situation in which a plurality of lateral grooves that are open toward narrow groove(s) 66 are provided along the tire circumferential direction D3 at main body portion 71—spaces between pairs of concavities 74 are of constant magnitude where no lateral groove(s) intervene therebetween, but this does not mean that spaces between pairs of concavities 74 are necessarily of constant magnitude where lateral groove(s) do intervene therebetween. The magnitude of space 740 might, for example, be 1 times to 2.5 times the magnitude of dimension S74.

As has been described up to this point, pneumatic tire 9 in accordance with the first embodiment is provided with tread rubber 61 that forms contact patch 611; and belt layer 62 which is disposed toward the interior in the tire radial direction D2 from tread rubber 61; wherein tread rubber 61 is provided with a plurality of lug portions 64 extending in the tire circumferential direction D3; wherein shoulder lug portion 64a, which is disposed in outermost fashion in the tire width direction D1 among the plurality of lug portions 64, is provided with narrow groove 66 extending in the tire circumferential direction D3 that partitions shoulder lug portion 64a into main body portion 71 and into sacrificial portion 76 which is disposed toward the exterior in the tire width direction D1 from main body portion 71; wherein, at edge 73 at which contact patch 611 at main body portion 71 and groove side face 67 toward the interior in the tire width direction that forms narrow groove 66 intersect, a plurality of concavities 74 that are open toward both contact patch 611 at main body portion 71 and groove side face 67 are formed with spaces 740 therebetween in the tire circumferential direction D3; and wherein innermost ends 741 in the tire width direction of the respective concavities 74 are disposed so as to be at the same location in the tire width direction D1 as outermost end 621 in the tire width direction of belt layer 62 or are arranged toward the exterior in the tire width direction D1 from outermost end 621 in the tire width direction of belt layer 62.

Tire 9 may suppress occurrence of step wear and river wear. At tire 9, on edge 73, a plurality of concavities 74 are formed with spaces 740 therebetween in the tire circumferential direction D3. Because tire 9 is provided with such constitution, it is possible to suppress nonuniformity of contact patch pressure in the tire circumferential direction D3 at region(s) 711 between narrow groove 66 and outermost end 621 in the tire width direction of belt layer 62 at main body portion 71. This is thought to be due to the fact that, at main body portion 71, portion(s) between concavities 74 are able to deform in such fashion as to spread out in the tire circumferential direction D3 during contact with the ground, making it possible for some of the force exerted thereon during contact with the ground to be dissipated in the tire circumferential direction D3. It is therefore possible for tire 9 to suppress occurrence of step wear and river wear.

If innermost ends 741 in the tire width direction of concavities 74 were to be arranged toward the interior in the tire width direction D1 from outermost end 621 in the tire width direction of belt layer 62, this would cause deterioration of the balance in contact patch pressure in the tire circumferential direction D3 at portion(s) (hereinafter "interior portion(s)") toward the interior in the tire width direction D1 from region(s) 711. This is because, while nonuniformity in contact patch pressure at interior portion(s) is less than at region(s) 711 due to the influence of belt layer 62, concavities 74 cause increase in nonuniformity at interior portion(s). But at tire 9 in accordance with the first embodiment, innermost ends 741 in the tire width direction of the respective concavities 74 are disposed so as to be at the same location in the tire width direction D1 as outermost end 621 in the tire width direction of belt layer 62 or are arranged toward the exterior in the tire width direction D1 from outermost end 621 in the tire width direction of belt layer 62. It is therefore possible for tire 9 to avoid such deterioration thereof.

If respective concavities 74 were not open toward groove side face 67 but were only open toward contact patch 611 at main body portion 71, because this would increase the tendency for portion(s) constituting edge 73 to flake off, endurance would be lower. But because, at tire 9 in accordance with the first embodiment, respective concavities 74 are open toward both contact patch 611 at main body portion 71 and groove side face 67, endurance is excellent.

If respective concavities 74 were not open toward contact patch 611 at main body portion 71 but were only open toward groove side face 67, it would be difficult to suppress nonuniformity in contact patch pressure in the tire circumferential direction D3 at region(s) 711. But because, at tire 9 in accordance with the first embodiment, respective concavities 74 are open toward both contact patch 611 at main body portion 71 and groove side face 67, it is possible to suppress nonuniformity in contact patch pressure in the tire circumferential direction D3.

At tire 9 in accordance with the first embodiment, because the spaces 740 between the plurality of concavities 74 are of constant magnitude, it is possible for tire 9 to effectively suppress nonuniformity in contact patch pressure in the tire circumferential direction D3 at region(s) 711.

At tire 9 in accordance with the first embodiment, because dimensions S74 in the tire circumferential direction D3 at the respective concavities 74 are equal, it is possible for tire 9 to effectively suppress nonuniformity in contact patch pressure in the tire circumferential direction D3 at region(s) 711.

At tire 9 in accordance with the first embodiment, the magnitudes of spaces 740 at the plurality of concavities 74 are 1 times to 2.5 times the magnitude of dimension S74. Because these are not less than 1 times the magnitude of dimension S74, it is possible to suppress occurrence of tearing such as might otherwise be initiated from the concavities 74. On the other hand, because these are not greater than 2.5 times the magnitude of dimension S74, it is possible to effectively suppress nonuniformity in contact patch pressure in the tire circumferential direction D3 at region(s) 711.

At tire 9 in accordance with the first embodiment, dimensions D74 in the tire radial direction D2 at the respective concavities 74 is each 10% to 15% of depth D63 of first major groove 63a. Because this is not less than 10%, it is possible to effectively suppress nonuniformity in contact patch pressure in the tire circumferential direction D3 at region(s) 711. Because this is not greater than 15%, it is possible to suppress occurrence of tearing such as might otherwise be initiated from the concavities 74.

First Variation

Whereas in the first embodiment the innermost ends 741 in the tire width direction of the respective concavities 74 were at the same location in the tire width direction D1, in the first variation they are not at the same location in the tire width direction D1. For example, innermost ends 741 in the tire width direction of some of the concavities 74 might be arranged toward the exterior in the tire width direction D1 from outermost end 621 in the tire width direction of belt layer 62, and innermost ends 741 in the tire width direction of the other concavity or concavities 74 might be disposed so as to be at the same location in the tire width direction D1 as outermost end 621 in the tire width direction of belt layer 62.

Second Variation

Whereas in the first embodiment the dimensions D74 in the tire radial direction D2 at the respective concavities 74 were equal, in the second variation they are not equal. For example, sets of two concavities 74 having mutually different dimensions D74 might be arrayed in the tire circumferential direction D3.

Third Variation

Whereas in the first embodiment the dimensions S74 in the tire circumferential direction D3 at the respective concavities 74 were equal, in the third variation they are not equal. For example, sets of two concavities 74 having mutually different dimensions S74 might be arrayed in the tire circumferential direction D3.

Fourth Variation

Whereas in the first embodiment the respective concavities 74 were each provided with two faces, in the fourth variation these are each provided with not less than three faces.

Fifth Variation

Whereas in the first embodiment the plurality of concavities 74 were formed with spaces 740 of constant magnitude therebetween in the tire circumferential direction D3, in the fifth variation the spaces 740 are not of constant magnitude.

Sixth Variation

Whereas in the first embodiment groove side face 67 of narrow groove 66 was parallel to the tire equatorial plane while groove side face 68 of narrow groove 66 was inclined with respect to the tire equatorial plane, in the sixth variation groove side face 67 is inclined with respect to the tire equatorial plane while groove side face 68 is parallel to the tire equatorial plane.

Seventh Variation

Whereas in the first embodiment the outermost end in the tire width direction of third belt ply 62c constituted the outermost end 621 in the tire width direction of belt layer 62, in the seventh variation other belt ply or plies constitute the outermost end 621 in the tire width direction of belt layer 62.

Eighth Variation

Whereas in the first embodiment the belt layer 62 was provided with four belt plies (these being, specifically, belt plies 62a, 62b, 62c, 62d), in the eighth variation the belt layer 62 is provided with five belt plies. For example, a fifth belt ply (not shown) might be provided toward the interior in the tire radial direction D2 from fourth belt ply 62d.

Ninth Variation

Whereas in the first embodiment the magnitudes of spaces 740 at plurality of concavities 74 are 1 times to 2.5 times the magnitude of dimension S74, in the ninth variation they might be less than 1 times the magnitude of dimension S74 or they might be greater than 2.5 times the magnitude of dimension S74.

Tenth Variation

Whereas in the first embodiment the dimensions D74 in the tire radial direction D2 at the respective concavities 74 are each 10% to 15% of depth D63 of first major groove 63a, in the tenth variation they might be less than 10% thereof or they might be greater than 15% thereof.

While embodiments in accordance with the present invention have been described above with reference to the drawings, it should be understood that the specific constitution thereof is not limited to these embodiments. The scope of the present invention is as indicated by the claims and not only as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

EXPLANATION OF REFERENCE NUMERALS

D1 . . . tire width direction; D2 . . . tire radial direction; D3 . . . tire circumferential direction;
5 . . . sidewall region; 51 . . . sidewall rubber;
6 . . . tread region; 61 . . . tread rubber; 611 . . . contact patch;
9 . . . tire; 41 . . . carcass; 42 . . . innerliner rubber;
62 . . . belt layer; 621 . . . outermost end in tire width direction of belt layer;
63 . . . major groove; 63a . . . first major groove; D63 . . . depth of first major groove;
64 . . . lug portion; 64a . . . shoulder lug portion; 64b . . . lug portion adjacent to shoulder lug portion;
66 . . . narrow groove; W66 . . . width of narrow groove; D66 . . . depth of narrow groove;
67 . . . groove side face at narrow groove; 68 . . . groove side face at narrow groove;
71 . . . main body portion; 711 . . . region(s); W71 . . . width of main body portion;
73 . . . edge;
74 . . . concavity; 741 . . . innermost end in tire width direction of concavity;
W74 . . . width of concavity; D74 . . . dimension in tire radial direction of concavity;
S74 . . . dimension in tire circumferential direction of concavity; 740 . . . space;
76 . . . sacrificial portion; W76 . . . width of sacrificial portion.

The invention claimed is:

1. A pneumatic tire comprising:
tread rubber that forms a contact patch; and
a belt layer which is disposed toward the interior in a tire radial direction from the tread rubber;
wherein the tread rubber is provided with a plurality of lug portions extending in a tire circumferential direction;
wherein a shoulder lug portion, which is disposed in outermost fashion in a tire width direction among the plurality of lug portions, is provided with a narrow groove extending in the tire circumferential direction that partitions the shoulder lug portion into a main body portion and into a sacrificial portion which is disposed toward the exterior in the tire width direction from the main body portion;
formed with spaces therebetween in the tire circumferential direction, at an edge at which the contact patch at the main body portion and a groove side face toward the interior in the tire width direction that forms the narrow groove intersect, there are a plurality of concavities that are open toward both the contact patch at the main body portion and the groove side face;
innermost ends in the tire width direction of the respective concavities are disposed so as to be at the same location in the tire width direction as an outermost end in the tire width direction of the belt layer or are arranged toward the exterior in the tire width direction from the outermost end in the tire width direction of the belt layer,
the groove side face toward the interior in the tire width direction that forms the narrow groove is parallel to a tire equatorial plane, the tire equatorial plane being a plane that is perpendicular to a rotational axis of the pneumatic tire and that is located centrally in the tire width direction;
a groove side face toward the exterior in the tire width direction that forms the narrow groove consists of a side face, in a meridian cross-section, extending along a single straight line and inclined with respect to the tire equatorial plane in such fashion as to cause a groove width of the narrow groove to become larger toward the interior side thereof in the tire radial direction, and
wherein the plurality of concavities each consist of two faces forming a v-shape on the contact patch at the main body portion and the groove side face toward the interior in the tire width direction that forms the narrow groove.

2. The pneumatic tire according to claim 1 wherein the spaces are of constant magnitude;
magnitudes of dimensions in the tire circumferential direction at the respective concavities are equal; and
the magnitude of the spaces is 1 times to 2.5 times the magnitude of the dimensions.

3. The pneumatic tire according to claim 1 wherein the tread rubber comprises a first major groove extending in the tire circumferential direction between the shoulder lug portion and a lug portion adjacent to the shoulder lug portion; and
magnitudes of dimensions in the tire radial direction at the respective concavities are 10% to 15% of a depth of the first major groove.

4. The pneumatic tire according to claim 1 wherein the spaces are of constant magnitude;
magnitudes of dimensions in the tire circumferential direction at the respective concavities are equal;
the magnitude of the spaces is 1 times to 2.5 times the magnitude of the dimensions;
the tread rubber comprises a first major groove extending in the tire circumferential direction between the shoulder lug portion and a lug portion adjacent to the shoulder lug portion; and
magnitudes of dimensions in the tire radial direction at the respective concavities are 10% to 15% of a depth of the first major groove.

5. The pneumatic tire according to claim 1 wherein the innermost ends in the tire width direction of the respective concavities are arranged toward the exterior in the tire width direction from the outermost end in the tire width direction of the belt layer.

6. The pneumatic tire according to claim 1 wherein the innermost ends in the tire width direction of the respective concavities are disposed so as to be at the same location in the tire width direction as the outermost end in the tire width direction of the belt layer.

7. The pneumatic tire according to claim 1 wherein the belt layer comprises a first belt ply, a second belt ply, a third belt ply, and a fourth belt ply;
of the first belt ply, the second belt ply, the third belt ply, and the fourth belt ply, the first belt ply is disposed in outwardmost fashion thereamong in the tire radial direction;
arranged in order as one proceeds from the first belt ply toward the interior in the tire radial direction are the second belt ply, the third belt ply, and the fourth belt ply; and an outermost end in the tire width direction of the third belt ply constitutes the outermost end in the tire width direction of the belt layer.

8. The pneumatic tire according to claim 1 wherein there are 160 to 480 of the concavities formed on the edge.

9. The pneumatic tire according to claim 1 wherein
the tread rubber comprises a first major groove extending in the tire circumferential direction between the shoulder lug portion and a lug portion adjacent to the shoulder lug portion; and
the narrow groove is narrower than the first major groove.

10. The pneumatic tire according to claim 1 wherein widths of the respective concavities as measured in the tire width direction are 1% to 5% of width of the main body portion as measured in the tire width direction.

11. The pneumatic tire according to claim 1 wherein width of the narrow groove is 4.0% to 7.0% of width of the main body portion as measured in the tire width direction.

12. The pneumatic tire according to claim 1 wherein width of the sacrificial portion as measured in the tire width direction is 5.0% to 10.0% of width of the shoulder lug portion as measured in the tire width direction.

13. The pneumatic tire according to claim 1 wherein the narrow groove extends continuously in the tire circumferential direction.

14. The pneumatic tire according to claim 1 wherein the edge and an edge at which a top face of the sacrificial portion and the groove side face toward the exterior in the tire width direction that forms the narrow groove intersect are disposed so as to be at the same planar location in the tire radial direction.

15. The pneumatic tire according to claim 1 wherein
the spaces are of constant magnitude;
magnitudes of dimensions in the tire circumferential direction at the respective concavities are equal;
the magnitude of the spaces is 1 times to 2.5 times the magnitude of the dimensions; and
the edge and an edge at which a top face of the sacrificial portion and the groove side face toward the exterior in the tire width direction that forms the narrow groove intersect are disposed so as to be at almost the same planar location in the tire radial direction.

* * * * *